United States Patent [19]
Kayumi

[11] Patent Number: 5,997,081
[45] Date of Patent: Dec. 7, 1999

[54] SEAT FOR A VEHICLE

[75] Inventor: Tetsuya Kayumi, Saitama, Japan

[73] Assignee: Honda Giken Kogyo Kabushiki Kaisha, Tokyo, Japan

[21] Appl. No.: 09/003,436

[22] Filed: Jan. 6, 1998

[30] Foreign Application Priority Data

Jan. 8, 1997 [JP] Japan ................................ 9-001380

[51] Int. Cl.⁶ ...................................................... A47C 7/62
[52] U.S. Cl. .................... 297/188.14; 297/411.32
[58] Field of Search ............................. 297/411.2, 411.3, 297/411.32, 411.38, 411.35, 188.01, 188.14, 248, 188.03; 248/95, 304, 339; 296/64

[56] References Cited

U.S. PATENT DOCUMENTS

| | | |
|---|---|---|
| 1,285,146 | 11/1918 | Harris . |
| 2,085,836 | 7/1937 | Tatum . |
| 2,107,813 | 2/1938 | Best . |
| 2,591,381 | 4/1952 | Scott-Dalgleish . |
| 3,785,600 | 1/1974 | Padovano . |
| 3,889,999 | 6/1975 | Mackintosh . |
| 4,118,069 | 10/1978 | Hunter . |
| 4,174,866 | 11/1979 | Rhyan . |

FOREIGN PATENT DOCUMENTS

| | | |
|---|---|---|
| 58-35437 | 3/1983 | Japan . |
| 60-106852 | 7/1985 | Japan . |
| 394604 | 6/1933 | United Kingdom . |

*Primary Examiner*—Milton Nelson, Jr.
*Attorney, Agent, or Firm*—Armstrong, Westerman, Hattori, McLeland & Naughton

[57] ABSTRACT

A hook device for a vehicle seat having a rotatable arm rest mounted on a side of a seat back. Left and right seats are disposed on opposite sides of a walk-through passage, and an arm rest is vertically rotatably mounted through a support shaft on the side of the seat back of each of the seats, which faces the walk-through passage. A hook member is mounted on a side of each arm rest at a location on an axis of the support shaft, so that a grip of a vinyl bag or the like may be hung from each hook member. The hook members and any bag hung therefrom may be used not only by occupants on the left and right seats, but also by occupants on seats at the rear of the left and right seats.

11 Claims, 10 Drawing Sheets

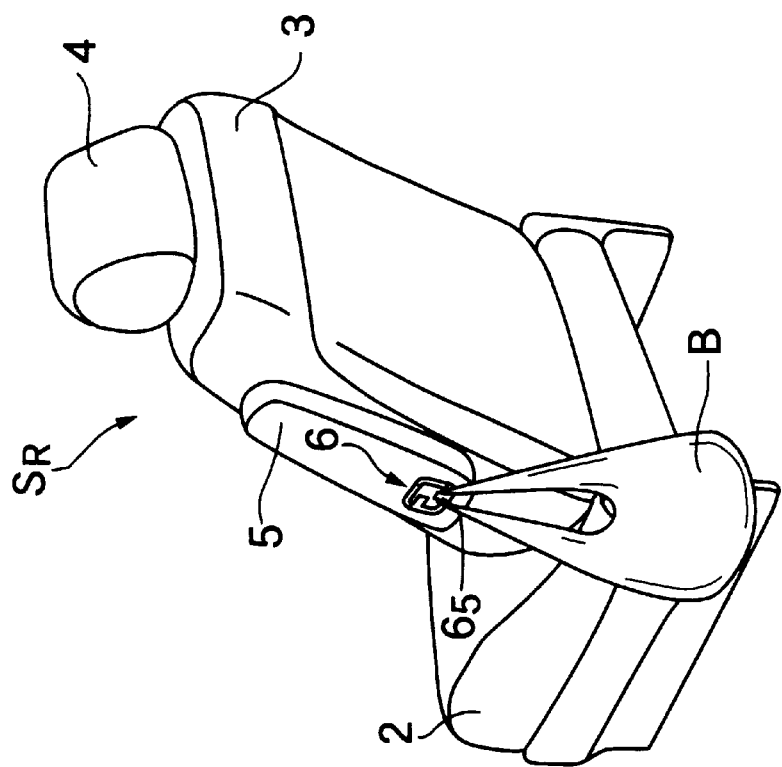
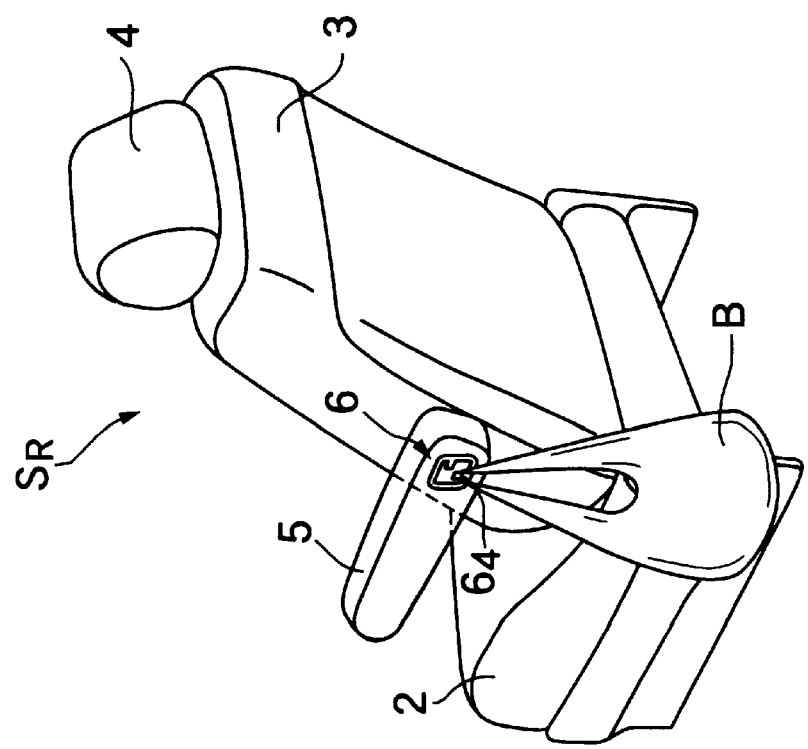

SEAT FOR A VEHICLE

BACKGROUND OF THE INVENTION

1. Field of Invention

The present invention relates to a seat for a vehicle, including an arm rest which is supported through a support shaft on a side of a seat back facing a longitudinally center plane of a vehicle body, and which is rotatable between a substantially horizontal service position and a retracted position in which it extends along the side of the seat back.

2. Description of the Relevant Art

Hook devices for hanging a vinyl bag provided upon shopping in a supermarket, and the like have conventionally been proposed in Japanese Utility Model Application Laid-open Nos. 58-35437 and 60-106852.

The hook device described in Japanese Utility Model Application Laid-open No.58-35437 suffers from a problem that a hook is provided on an instrument panel and hence, can be used only by occupants on a driver's side or seat and an assistant driver's side or seat. The hook device described in Japanese Utility Model Application Laid-open No.60-106852 suffers from a problem that a hook is mounted on a side of a seat back and hence, when a rotatable arm rest is provided on the side of the seat back, if the arm rest is rotated into a retracted position in which it extends along the side of the seat back, the hook cannot be used because it is covered by the arm rest.

SUMMARY OF THE INVENTION

The present invention has been accomplished with the above circumstance in view, and it is an object of the present invention to provide a seat for a vehicle including a hook device which can be utilized for seats having rotatable arm rests each provided on a side of a seat back and can be used by a plurality of occupants seated on front and rear seats.

To achieve the above object, according to the present invention, the hook member is mounted on the arm rest and hence, can be used without being covered or otherwise hindered by the arm rest. In addition, since the hook member is disposed on the side of the arm rest facing a longitudinally extending center plane of the vehicle body, the hook member can be used not only by occupants seated on the left and right seats, but also by occupants seated on seats to the rear of such left and right seats. The term "longitudinally extending center plane of the vehicle body" is defined as being a longitudinal plane extending through a longitudinal center line of the vehicle body.

According to a further feature of the present invention, the hook member does not protrude from the side of the arm rest and hence, when the hook member is not used, it cannot be a hindrance to the occupant. Especially, in a vehicle including a walk-through passage on the longitudinally extending center plane of the vehicle body, the hook member does not interfere with an occupant passing through the walk-through passage.

According to a still further feature of the present invention, the hook member is located on the axis of the support shaft which supports the arm rest thereon. Therefore, even if the arm rest is rotated about the support shaft, the position of the hook member does not change either longitudinally or vertically, which leads to an improved way for using the hook member.

According to a still further feature of the present invention, when the arm rest having the hook member fixed thereto is in the service position, the hook portion of the hook member is directed obliquely upwards with respect to the horizon extending forwards of the vehicle body. Therefore, even if the arm rest is rotated from the service position to the retracted position, the hook portion is not directed downward with respect to the horizontal and hence, any goods hung from the hook portion will not drop off.

According to a still further feature of the present invention, when the arm rest having the hook member fixed thereto is in the service position, a first hook portion is directed upwards with respect to the horizon, and when the arm rest is in the retracted position, a second hook portion is directed upwards with respect to the horizon. Therefore, even if the arm rest is in either of the service position and the retracted position, goods can be hung from either the first or second hook portion.

According to another embodiment of the present invention, the hook member is fixed to the support shaft fixed to the seat back and therefore, even if the arm rest is rotated, the hook member is not rotated and hence, there is no possibility that the goods hung from the hook portion will drop down.

According to a still further feature of the present invention, left and right hook members are disposed symmetrically on seats on the opposite sides of the longitudinally extending central plane of the vehicle body and therefore, for example, a vinyl bag can be hung in a stable attitude by hooking a pair of grips of the vinyl bag on the left and right hook members.

BRIEF DESCRIPTION OF DRAWINGS

FIGS. 10A and 10B are views for explaining the operation of the embodiment of FIG. 8.

DESCRIPTION OF THE PREFERRED EMBODIMENTS

The mode for carrying out the present invention will now be described by way of embodiments shown in the accompanying drawings.

Figure 1:
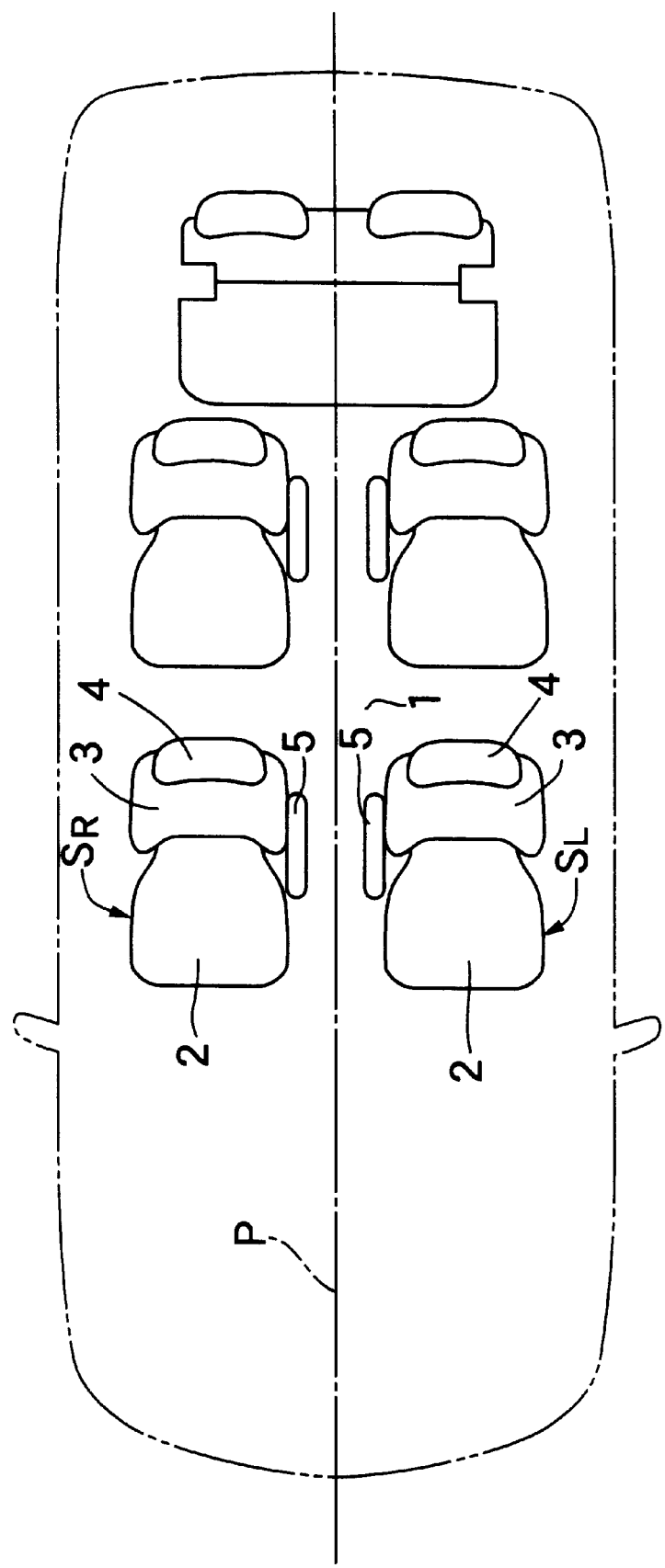
FIG. 1 is a plan view of an automobile vehicle.
Figure 2:
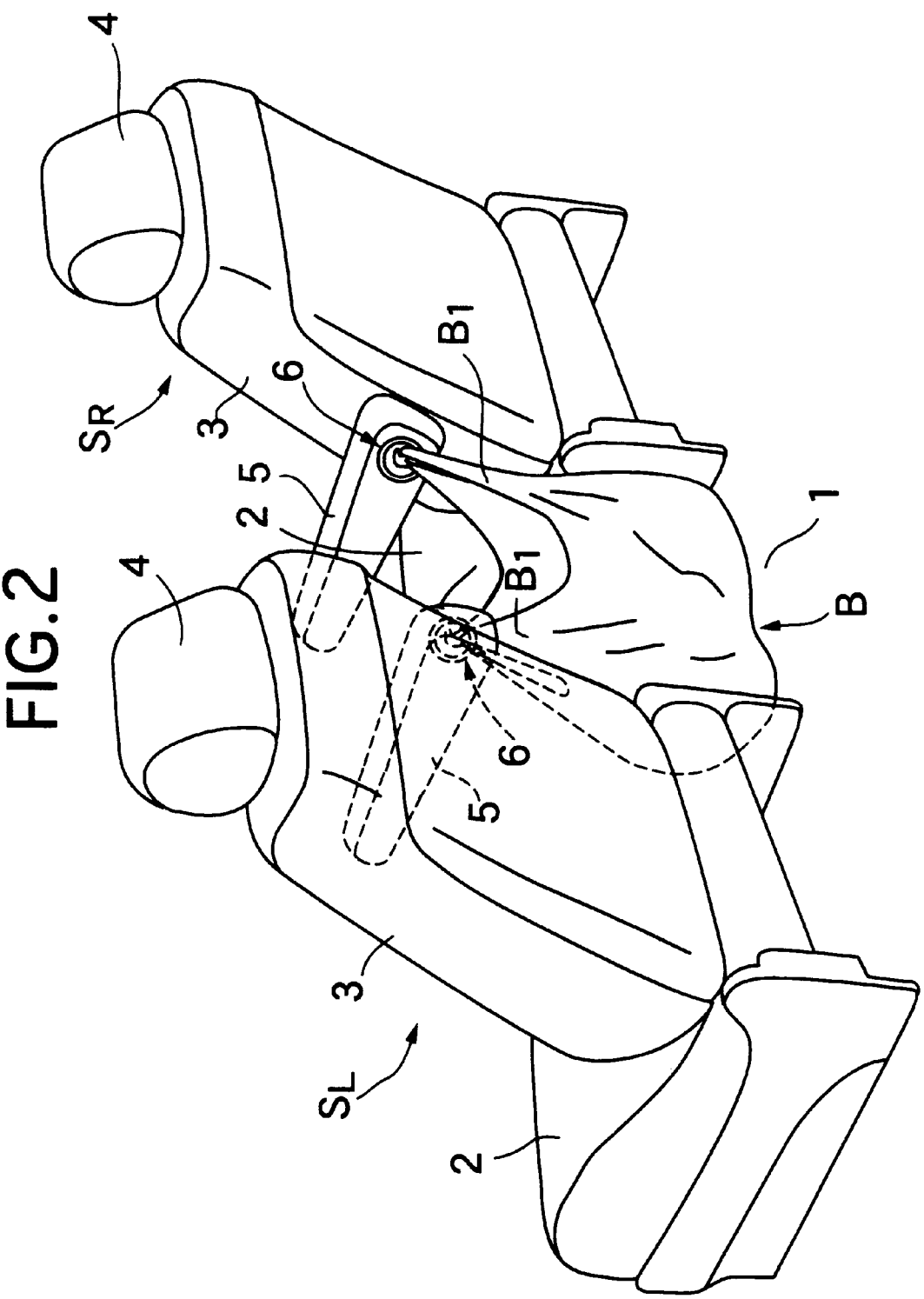
FIG. 2 is a perspective view of seats in a front row in the automobile vehicle of FIG. 1.

FIGS. 1 to 5 illustrate a first embodiment of the present invention. As shown in FIGS. 1 and 2, a front row of seats in a recreational vehicle including three rows of seats arranged at spacings from each other longitudinally of the vehicle is comprised of a right driver's seat $S_R$ and a left assistant driver's seat $S_L$. A walk-through passage 1 is defined between the driver's seat $S_R$ and the assistant driver's seat $S_L$ to extend along a longitudinally extending center plane P of a vehicle body, so that an occupant can move longitudinally. Each of the driver's seat $S_R$ and the assistant driver's seat $S_L$ includes a seat cushion 2, a seat back 3 reclinably supported at a rear end of the seat cushion 2, a head rest 4 mounted at an upper end of the seat back 3, and an arm rest 5 mounted on a side of the seat back 3 opposed to the walk-through passage 1.

A hook member 6 for hanging any of various goods therefrom is mounted at a rear portion of each of the left and right arm rests 5. Shown in FIG. 2 is a state in which a pair of grips $B_1$ of a vinyl bag B have been hooked on and hung from the left and right hook members 6. If the pair of grips $B_1$, of the vinyl bag B are hooked on the left and right hook members 6 in the above manner, the vinyl bag B can be hung in an opened state and in a stable attitude above the walk-through passage 1. Therefore, it is easy to place and remove the goods into and from the bag, and also, the vinyl bag B is not a hindrance to an occupant seated on the seat. In addition, since the hook members 6 are mounted on the arm rests 5, it is possible for not only the occupants on the driver's seat and the assistant driver's seat to use the hook members 6, but also for occupants on the seats in the intermediate row at the rear of the front row seats to use the hook members 6. Further, each hook member 6 is mounted on the arm rest 5 itself and hence, when the arm rest 5 has been rotated, the hook member 6 is not covered by the arm rest 5 and can still be used.

Figure 3:
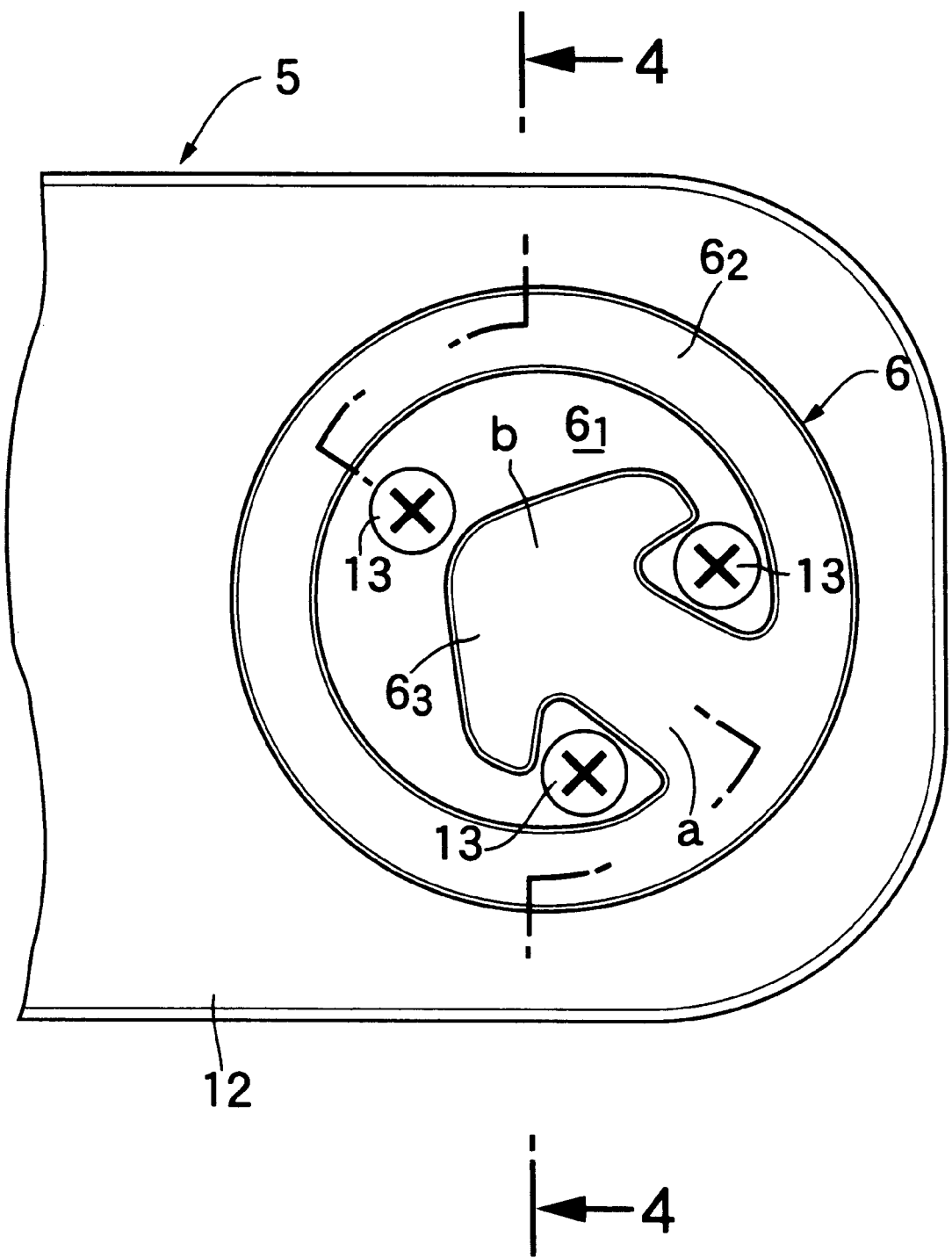
FIG. 3 is an enlarged view of an essential portion shown in FIG. 1 and FIG. 2.
Figure 4:
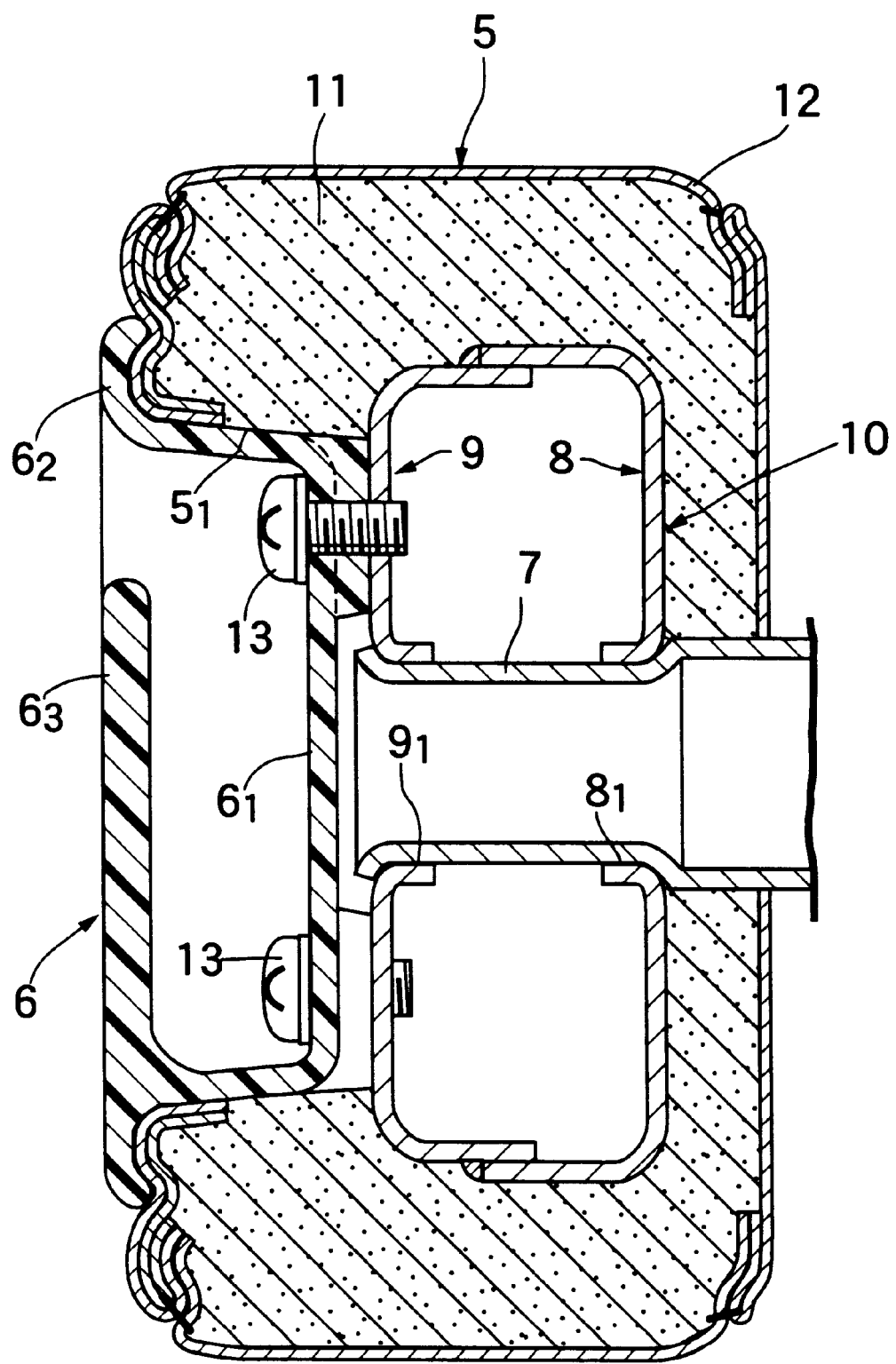
FIG. 4 is a sectional view taken along a line 4—4 in FIG. 3.

As can be seen from FIGS. 3 and 4, the arm rest 5 is vertically rotatably supported at its rear end on a support shaft 7 fixed to a frame (not shown) of the seat back 3 to protrude from the side of the seat back 3. Thus, the arm rest 5 is comprised of a frame 10 formed by coupling an inner frame half 8 and an outer frame half 9 together, a pad 11 covering the outside of the frame 10, and a skin material 12 covering the outside of the pad 11. The arm rest 5 is vertically rotatably supported on the support shaft 7 by caulking a tip end of the support shaft 7 passing through shaft bores $8_1$ and $9_1$ defined in the frame 10. It should be noted that the support shaft 7 may also be rotatably supported on the frame of the seat back 3, and the arm rest 5 may be fixed to the support shaft 7.

A recess $5_1$ is defined in that side of the arm rest 5 which faces the tip end of the support shaft 7, and the hook member 6 integrally formed by molding from a synthetic resin is inserted into the recess $5_1$ and fixed to the outer frame half 9 by three bolts 13. The hook member 6 includes a cup-like body portion $6_1$ having a circular opening, an annular flange portion $6_2$ connected to the opening of the body portion $6_1$, and a hook portion $6_3$ extending radially inwards from the flange portion $6_2$. Further, the hook portion $6_3$ is formed into an anchor-like shape and includes a shaft portion a connected to the flange portion $6_2$, and a head portion b formed by expanding a tip end of the shaft portion a (see FIG. 3). Therefore, if the grip $B_1$ of the vinyl bag B is inserted from a gap between the head portion b and the flange portion $6_2$ and hooked on the shaft portion a, the grip $B_1$ is prevented from falling off or being dropped by the head portion b.

As can be seen from FIG. 4, the hook portion $6_3$ of the hook member 6 lies on the same plane as the flange portion $6_2$, and the hook member 6 is fitted in the recess $5_1$ defined in the side of the arm rest 5. Therefore, the hook member 6 is not a hindrance to the movement of an occupant through the walk-through passage 1.

Figure 5A:
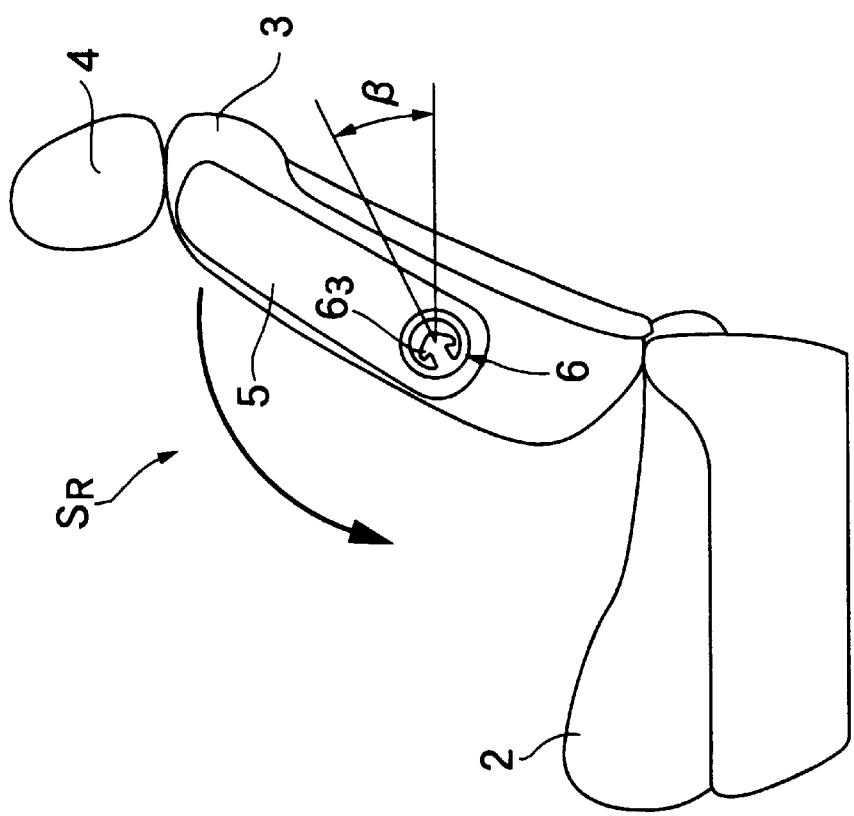
FIGS. 5A and 5B are views for explaining the operation of the present invention.
Figure 5B:
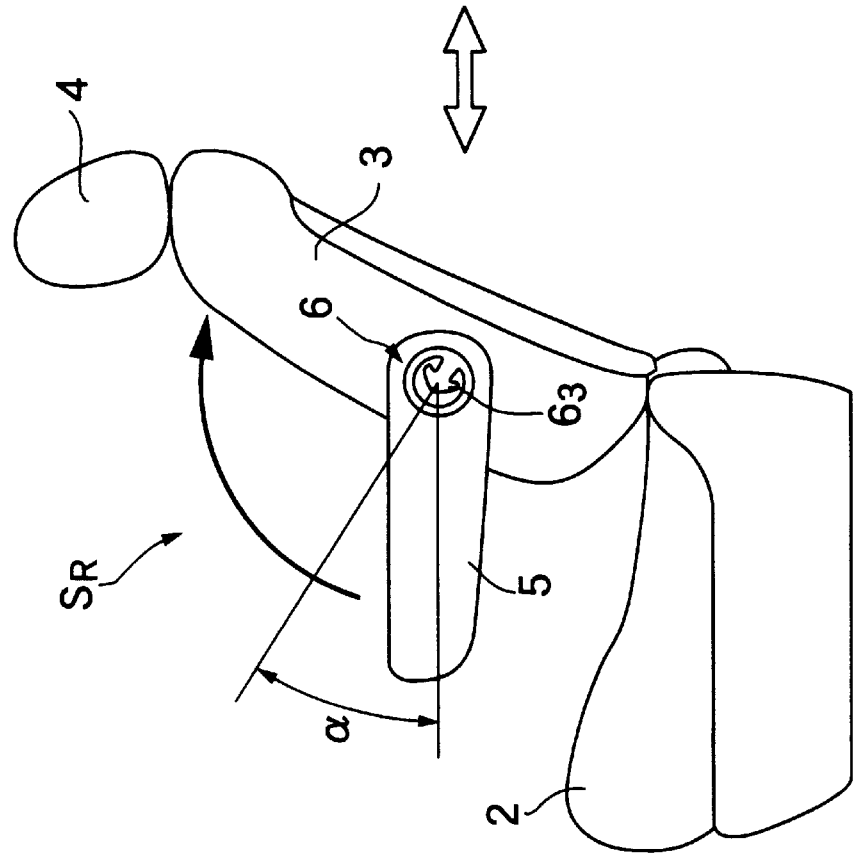

As can be seen from FIG. 5A, when the arm rest 5 is at a substantially horizontal position, the hook portion $6_3$ is directed upwards by an angle α with respect to a horizontally forward direction. If the arm rest 5 is righted from this state into a retracted position in which it extends along the side of the seat back 3, the hook portion $6_3$ is directed upwards by an angle β with respect to a horizontally rearward direction as shown by FIG. 5B. Thus, in any position of the arm rest 5 between the service position and the retracted position, the hook portion $6_3$ is not directed downwards with respect the horizontal direction. Therefore, in either of the positions, the hook member 6 can be used without hindrance. Also even if the arm rest 5 is rotated in a condition in which the grip $B_1$ has been hooked on the hook portion $6_3$, there is no possibility that the grip $B_1$ will become unhooked from the hook portion $6_3$. Even when the arm rest 5 is at a retracted position, the hook portion $6_3$ is directed upwards by the angle β, and hence, even if the seat back 3 is reclined, the grip $B_1$ will not become unhooked from the hook portion $6_3$.

Further, the hook member 6 is mounted coaxially with the support shaft 7 of the arm rest 5 and hence, even if the arm rest 5 is rotated between the service position and the retracted position, the position of the hook member 6 is not moved vertically. Therefore, if the pair of grips $B_1$, of the vinyl bag B are hung down from the hook members 6 of the driver's seat $S_R$ and the assistant driver's seat $S_L$, respectively, as shown in FIG. 2, then there is no possibility that the attitude of the vinyl bag B will become unstabilized, even if one of the left and right arm rests 5 is brought into the service position, while the other arm rest 5 is brought into the retracted position.

Figure 6:
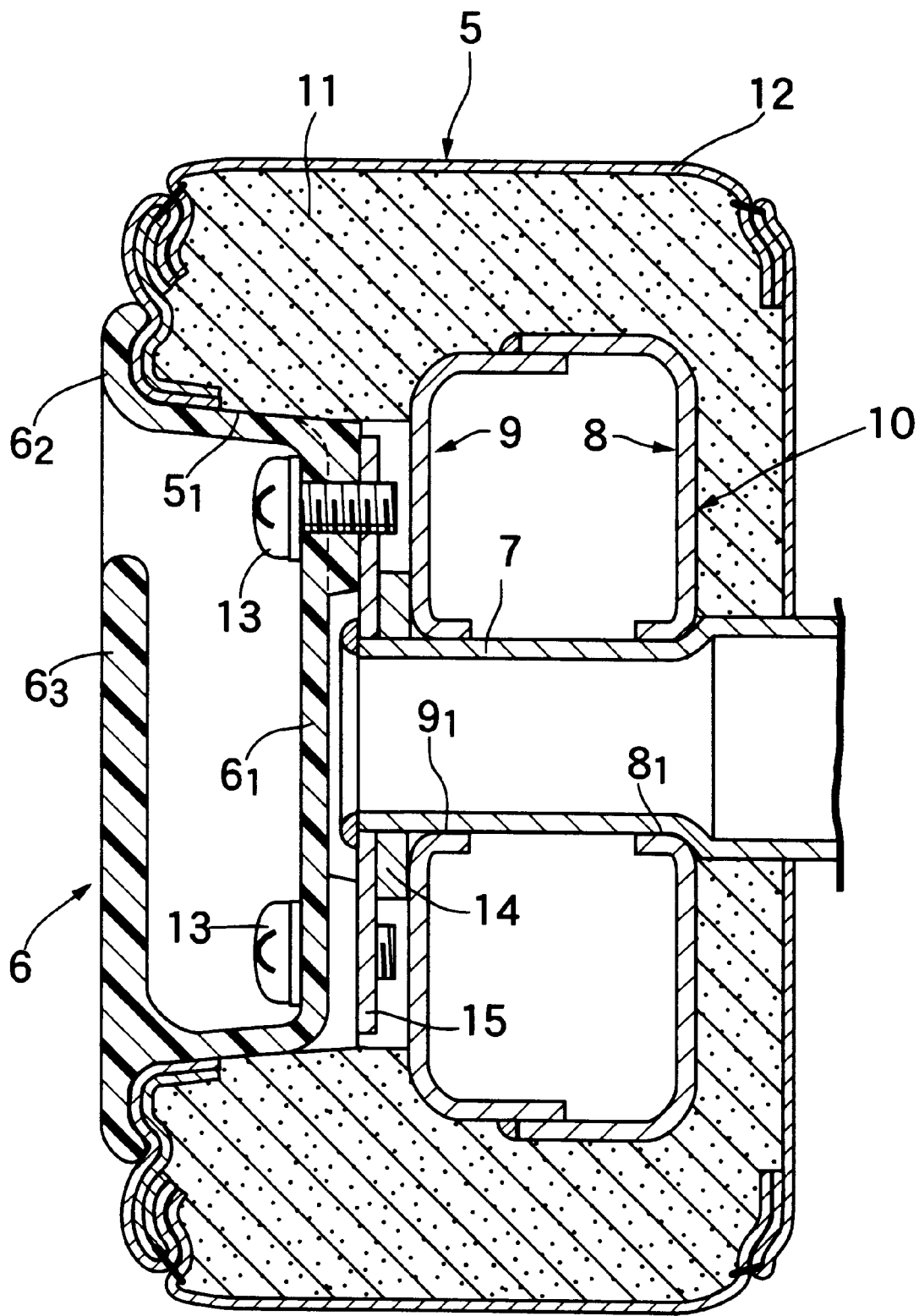
FIG. 6 is a view similar to FIG. 4, but showing a second embodiment of the present invention.
Figure 7:
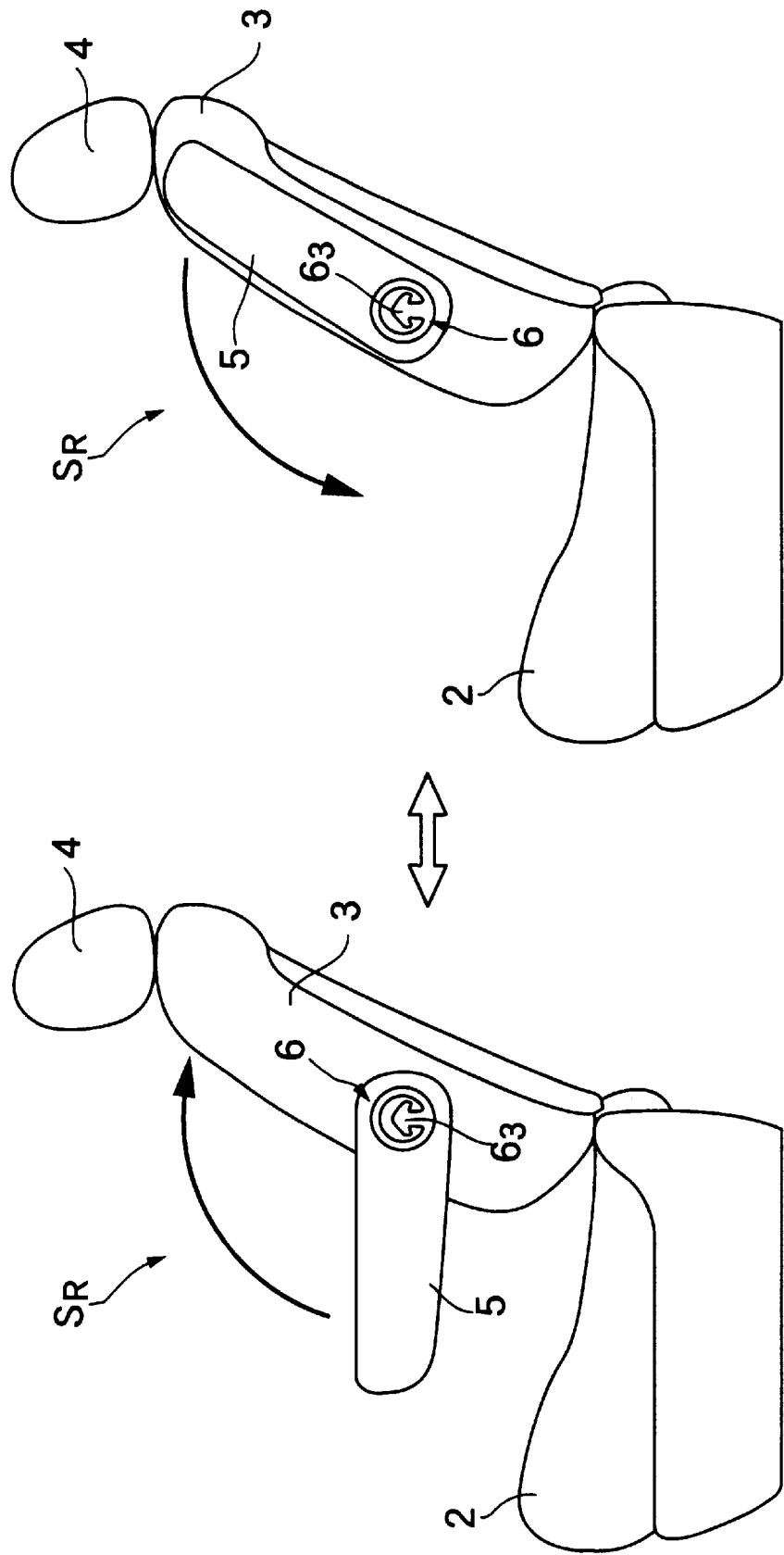
FIGS. 7A and 7B are views for explaining the operation of the embodiment of FIG. 6.

A second embodiment of the present invention will now be described with reference to FIGS. 6 and 7.

In the second embodiment, a plate 15 is welded through a washer 14 to a tip end of a support shaft 7 protruding through the frame 10 of the arm rest 5, and a hook member 6 is fixed to the plate 15 by three bolts 13. More specifically, the hook member 6 is non-rotatably fixed to the seat back 3 and the support shaft 7. If the arm rest 5 is rotated between the service position and the retracted position, an outer peripheral surface of the body portion $6_1$ of the hook member 6 and an inner peripheral surface of the recess $5_1$ in the arm rest 5 slide relative to each other. Therefore, by fixing the hook member 6 with the hook portion $6_3$ directed upwards, the hook portion $6_3$ can be used without hindrance, even if the arm rest 5 is in either one of the service position and the retracted position.

Figure 8:
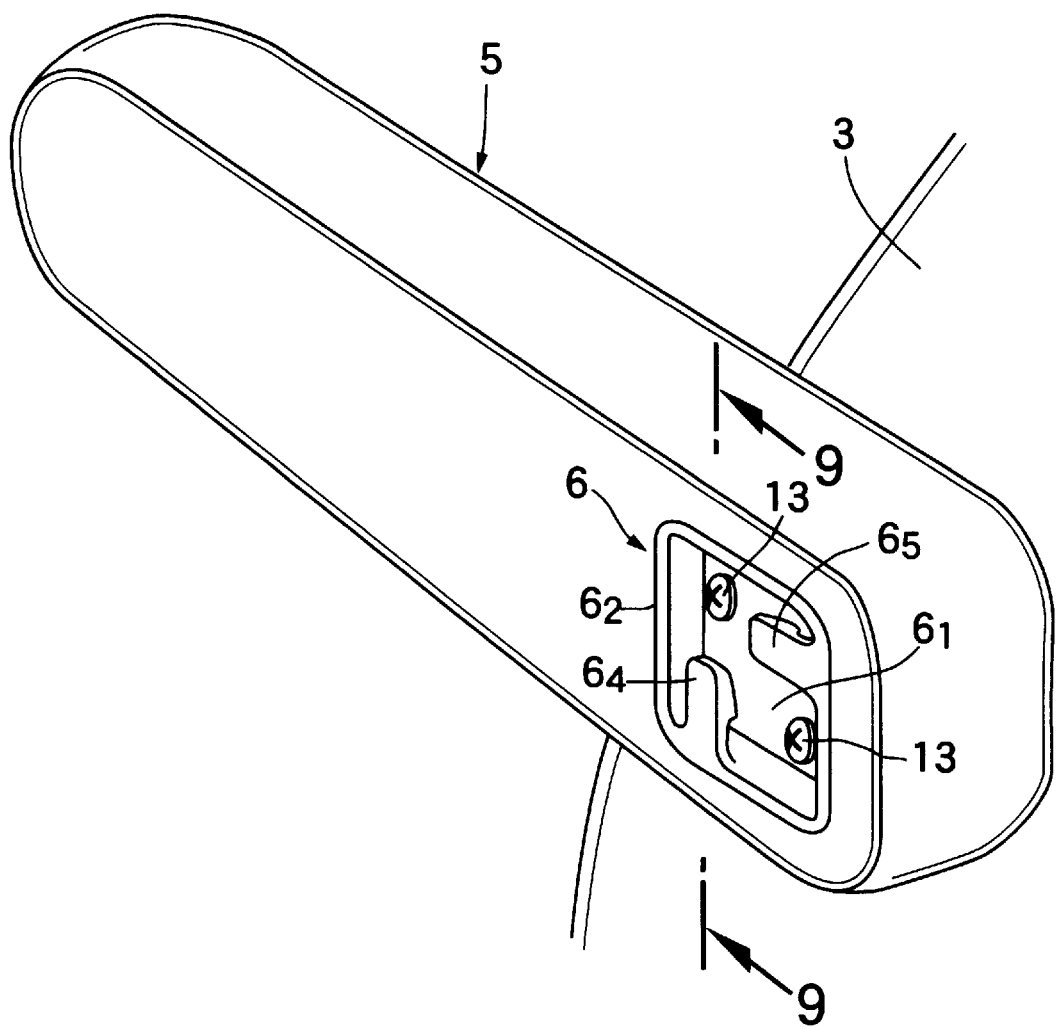
FIG. 8 is a perspective view of an arm rest according to a third embodiment of the invention.
Figure 9:
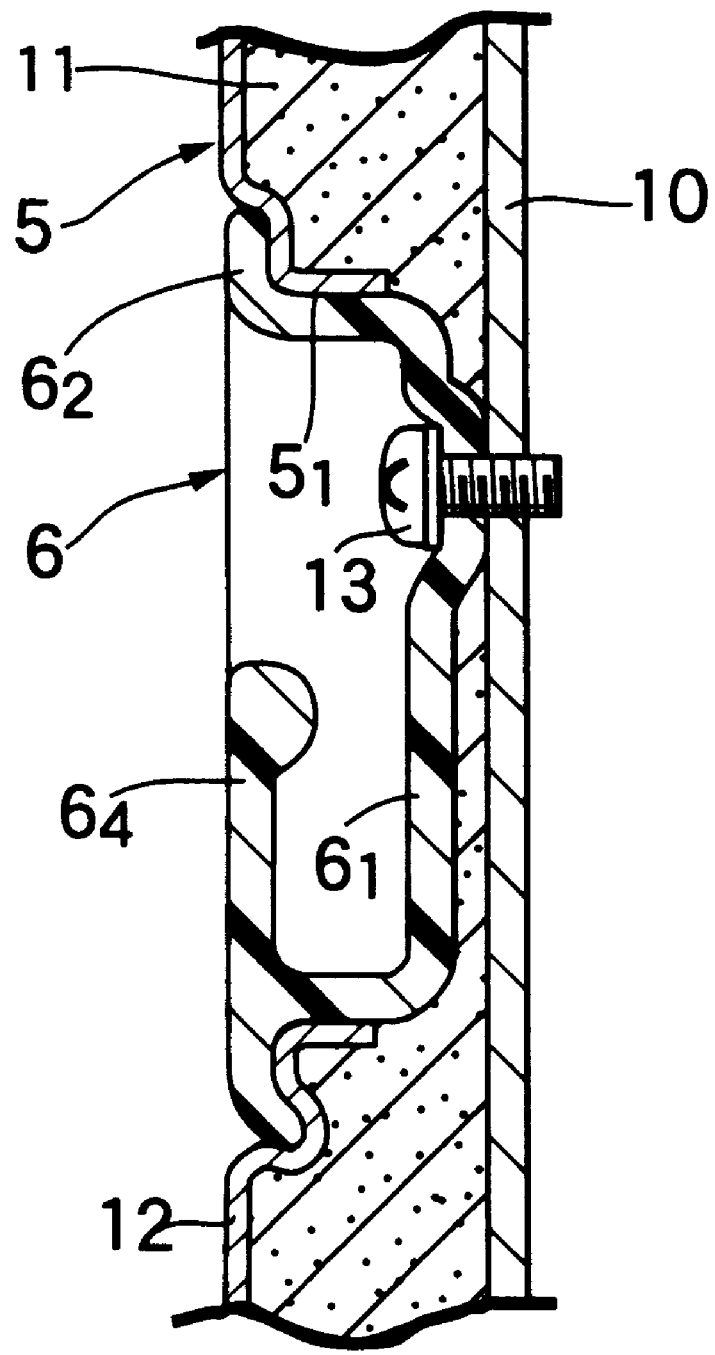
FIG. 9 is an enlarged sectional view taken along a line 9—9 in FIG. 8.

FIGS. 8 to 10 illustrate a third embodiment of the present invention. A hook member 6 in the third embodiment includes a cup-like body portion $6_1$ having a quadrilateral opening, a quadrilateral flange portion $6_2$ connected to the opening of the body portion $6_1$, and two hook portions $6_4$ and $6_5$ extending inwards from adjacent two sides of the flange portion $6_2$ to form an angle of 90° relative to each other. The hook member 6 is fixed to the frame 10 by two bolts 13 with its body portion $6_1$ inserted in a recess $5_1$ defined in the side of the arm rest 5.

When the arm rest 5 is in its horizontal service position, as shown in FIG. 10A, the upward-directed first hook portion $6_4$ is used, and when the arm rest 5 is in its righted and retracted position, as shown in FIG. 10B, the upward-directed second hook portion $6_5$ is used. Thus, in any position of the arm rest 5 between the service position and the retracted position, the vinyl bag B or the like can be hung using one of the hook portions $6_4$ and $6_5$.

Although the embodiments of the present invention have been described in detail, it will be understood that the present invention is not limited to the above-described embodiments, and various modifications in design may be made without departing from the subject matter of the invention.

For example, in the embodiments, in a vehicle including the longitudinally distanced three rows of seats, the seats in the front row have been illustrated, but the present invention is equally applicable to seats in a second row. For certain applications of the present invention where it is not considered advantageous to locate the hook member on the axis of the support shaft, the hook member may be disposed in a location offset from the axis of the support shaft e.g., at a longitudinally central portion or a front end of the arm rest.

In accordance with the present invention, the hook member for hanging the goods is disposed on the side of an arm rest facing the longitudinally extending center plane of the vehicle body. Therefore, the hook member can be used without hindrance by the arm rest, and can also be used not only by occupants seated on the left and right front seats, but also by occupants seated on seats to the rear of such left and right front seats, leading to an enhanced convenience.

Further, the hook member is accommodated in a recess defined in the side of the arm rest. Therefore, the hook member which is not in service cannot be a hindrance. The hook member is especially convenient in a vehicle including a walk-through passage on the longitudinally extending center plane of the vehicle body.

Still further, the hook member of the present invention may be disposed on the axis of the support shaft which supports the arm rest thereon. Therefore, even if the arm rest is rotated about the support shaft, the position of the hook member is not changed and hence, the orientation of the hook member remains constant in use.

According to a further feature of the present invention, the hook member may be fixed to the arm rest, so that when the arm rest is in the service position, the hook portion of the hook member is disposed in an attitude directed obliquely upwards with respect to the horizon extending forward of the vehicle body. Therefore, even if the arm rest is rotated between the service position and the retracted position, the hook portion is prevented from being directed downward with respect to the horizon and hence, the goods hung from the hook portion will not drop down.

According to a still further feature of the present invention, the hook member may be fixed to the arm rest and provided with a first hook portion which is adapted to be directed upwards with respect to the horizon when the arm rest is in the service position, and a second hook portion which is adapted to be directed upwards with respect to the horizon when the arm rest is in the retracted position. Therefore, with the arm rest in either one of the service position and the retracted position, the goods can be hung using one of the first and second hook portions.

According to a further feature of the present invention, the hook member may be fixed to the support shaft fixed to the seat back. Therefore, even if the arm rest is rotated, the hook member is retained at a constant attitude, and there is no possibility of any goods hung from the hook portion being dropped down.

According to a still further feature of the present invention, left and right seats disposed symmetrically on opposite sides of the longitudinally extending center plane of a vehicle body may provide a pair of left and right hook members. Therefore, for example, a vinyl bag can be hung in a stable attitude and in a wide open state by hooking a pair of grips of the vinyl bag on the pair of hook members mounted on the arm rests of the left and right seats.

What is claimed is:

1. A seat for a vehicle, comprising: an arm rest supported by a support shaft on a side of a back of said seat facing a longitudinally extending center plane of a vehicle body, said arm rest being rotatable between a substantially horizontal service position and a retracted position in which said arm rest extends along said side of said seat back, and a hook member disposed on a side of said arm rest which is facing the longitudinally extending center plane of said vehicle body, for hanging a good therefrom.

2. A seat for a vehicle according to claim 1, wherein said hook member includes a hook portion, said hook member is fixed to said arm rest, and said hook portion of said hook member is disposed in an attitude directed obliquely upwards with respect to the horizon when said arm rest is in said service position.

3. A seat for a vehicle according to claim 1, wherein said hook member is disposed on an axis of said support shaft which supports said arm rest.

4. A seat for a vehicle according to claim 1, wherein a recess is defined in said side of the arm rest and said hook member is accommodated in said recess.

5. A seat for a vehicle according to claim 4, wherein said hook member is disposed on an axis of said support shaft which supports said arm rest.

6. A seat for a vehicle according to claim 4, wherein said hook member includes a hook portion, said hook member is fixed to said arm rest, and said hook portion of said hook member is disposed in an attitude directed obliquely upwards with respect to the horizon when said arm rest is in said service position.

7. A seat for a vehicle according to claim 1 or claim 4, wherein said hook member comprises one of a pair of left and right hook members disposed symmetrically on opposite sides of said longitudinally extending center plane of the vehicle body and the other hook member of said pair of hook members is provided on a side of an arm rest rotatably mounted to a back of a second seat disposed on the side of said longitudinally extending center plane opposite from said one hook member.

8. A seat for a vehicle according to claim 1 or claim 4, wherein said hook member is fixed to said arm rest, said hook member is provided with a first hook portion which is adapted to be directed upwards with respect to the horizon when the arm rest is in the service position, and said hook member is provided with a second hook portion which is adapted to be directed upwards with respect to the horizon when the arm rest is in the retracted position.

9. A seat for a vehicle according to claim 1 or claim 4, wherein said hook member is fixed to said support shaft and said support shaft is fixed to said seat back.

10. A seat for a vehicle, comprising: an arm rest supported by a support shaft on a side of a back of said seat facing a longitudinally extending center plane of a vehicle body, said arm rest being rotatable about said support shaft between a substantially horizontal service position and a retracted position in which said arm rest extends along said side of said seat back, and a hook member disposed on a side of said arm rest which is facing the longitudinally extending center plane of said vehicle body, for hanging a good therefrom.

11. A seat for a vehicle, comprising: an arm rest supported by a support shaft on a side of a back of said seat facing a longitudinally extending center plane of a vehicle body, said arm rest being rotatable between a substantially horizontal service position and a retracted position in which said arm rest extends along said side of said seat back, and a hook member disposed on a side of said arm rest which is facing the longitudinally extending center plane of said vehicle body, for hanging a good therefrom, wherein the hook member is not covered or otherwise hindered by the arm rest.

* * * * *